Dec. 24, 1957  S. W. ALDERFER  2,817,597
DECORATIVE CUSHION FABRIC AND PROCESS OF MAKING SAME
Filed Nov. 29, 1954  2 Sheets-Sheet 1
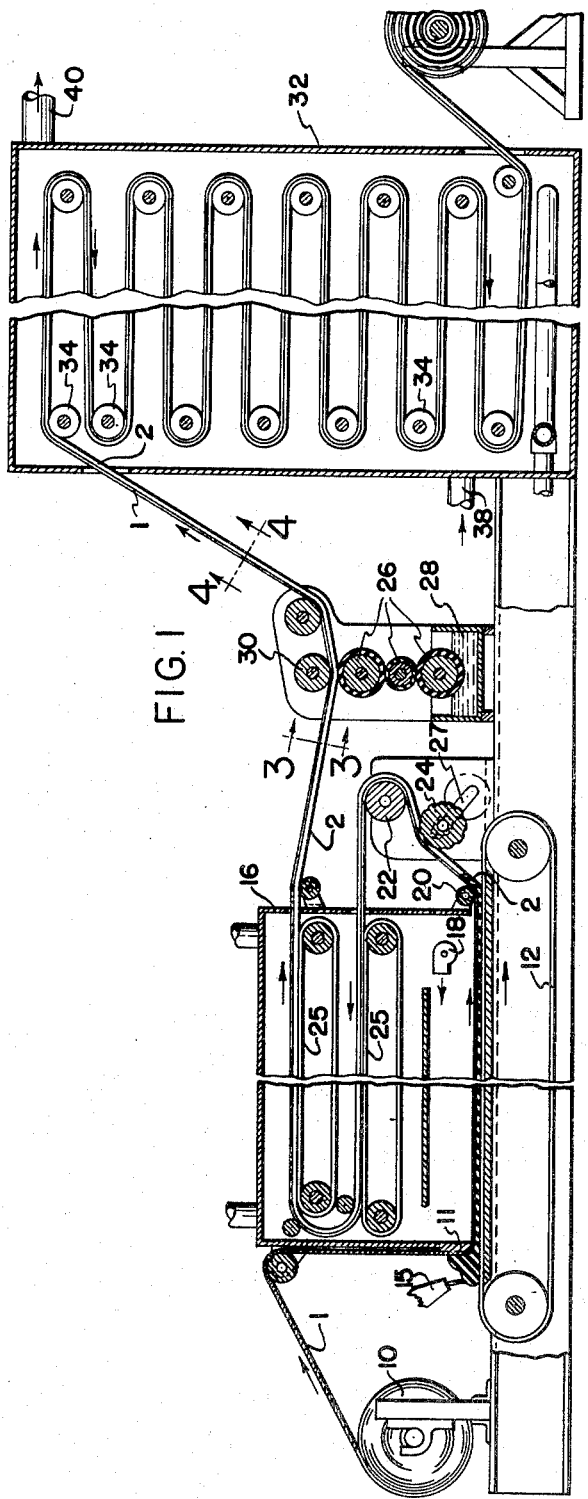
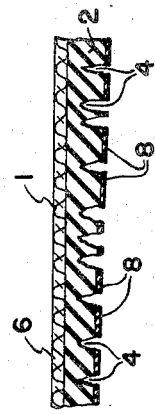
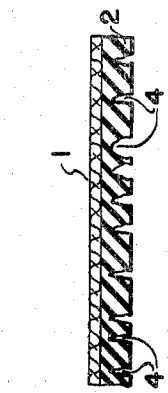
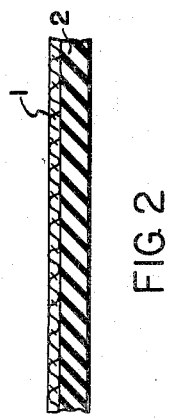
INVENTOR.
STERLING W. ALDERFER
BY
*Ely. Fryed Hamilton*
ATTORNEYS Dec. 24, 1957  S. W. ALDERFER  2,817,597
DECORATIVE CUSHION FABRIC AND PROCESS OF MAKING SAME
Filed Nov. 29, 1954  2 Sheets-Sheet 2

INVENTOR.
STERLING W. ALDERFER
BY
ATTORNEYS

United States Patent Office 2,817,597
Patented Dec. 24, 1957

2,817,597

DECORATIVE CUSHION FABRIC AND PROCESS OF MAKING SAME

Sterling W. Alderfer, Akron, Ohio, assignor, by mesne assignments, to The Kendall Company, Walpole, Mass., a corporation of Massachusetts Application November 29, 1954, Serial No. 471,701

12 Claims. (Cl. 117—10)

The present invention relates to the manufacture of decorative fabrics of the type in which a layer of sponge rubber, which is vulcanized to a fabric, is embossed with a decorative design and then the high portions of the design covered and protected by a coating which may be of a color to contrast with the body of the cushion and with the portions thereof which are exposed at the depressions.

For the outer coating it is preferred to use a material which will form an effective bond with the rubber and which may have a gloss or sheen. While any type of coating may be applied, it is preferred to use a coating of a plastic material such as one of the synthetic resins. Vinyl chloride, vinyl acetate, polyethylene, alkyd resins and polyamides of low melting points, and halogen substituted polyethylenes are given as examples of the materials which may be used as bases for the coatings. As the product may be used for seat coverings and as an upholstery fabric, the coatings should be flexible and able to withstand rough usage.

In addition to the decorative features, the product shown and described herein is porous throughout because the depressed portions of the design are not covered with the coating and serve as channels through which the material may "breathe." This is also important if the outer coating is applied before the material is vulcanized.

The product is made by uniting a fabric base or backing to a layer of sponge rubber by applying to the fabric a coating or layer of uncured sponge rubber in the form of foamed latex and then gelling and thereafter curing the sponge rubber. By this means the sponge rubber is united to the fabric by a vulcanized bond, and the composite layer is porous throughout because the cells of the sponge layer are in communication with each other and with the interstices of the fabric base. After the sponge rubber layer is applied and when it has gelled either partially or completely, but before final vulcanization, the sponge rubber layer is embossed so that the design appears therein in intaglio (i. e. the embossing forms depressed areas in the sponge rubber).

After the product has been embossed it is vulcanized and, either before or after the final vulcanization, the outer coating should be applied to the raised surfaces of the sponge rubber.

If the material which is used for the coating is a thermosetting resin, it may be advisable to apply the coating before the embossed sheeting is passed into the vulcanizing chamber. On the other hand, it may be desirable to complete the vulcanization of the sponge rubber before applying the outer coating. The latter procedure has the advantage that the embossed material may be shipped to the ultimate user who may apply the final coating to the product in any form he desires.

While foamed rubber latex is preferred as the material from which the cushion layer is to be made, it is possible to use foamed resinous materials, such as foamed vinyl chloride combined with suitable plasticizers. It is also possible to cure the sponge material by electronic means or by the application of heat without blowing air through the sponge.

In the drawings there are shown two alternative methods of making the complete product in a continuous series of operations, it being understood, however, that the application of the final outer coating need not be done at that time. It will also be appreciated that exact following of the steps shown is not necessary and that changes and modifications may be made in the process without sacrificing the benefits of the invention.

In the drawings:

Fig. 1 is a more or less diagrammatic sectional view through a typical apparatus for manufacturing the product in a continuous series of operations.

Figs. 2, 3 and 4 are sections on the lines 2—2, 3—3 and 4—4, respectively, of Fig. 1, taken through the product at the various stages of its manufacture.

Figure 5:
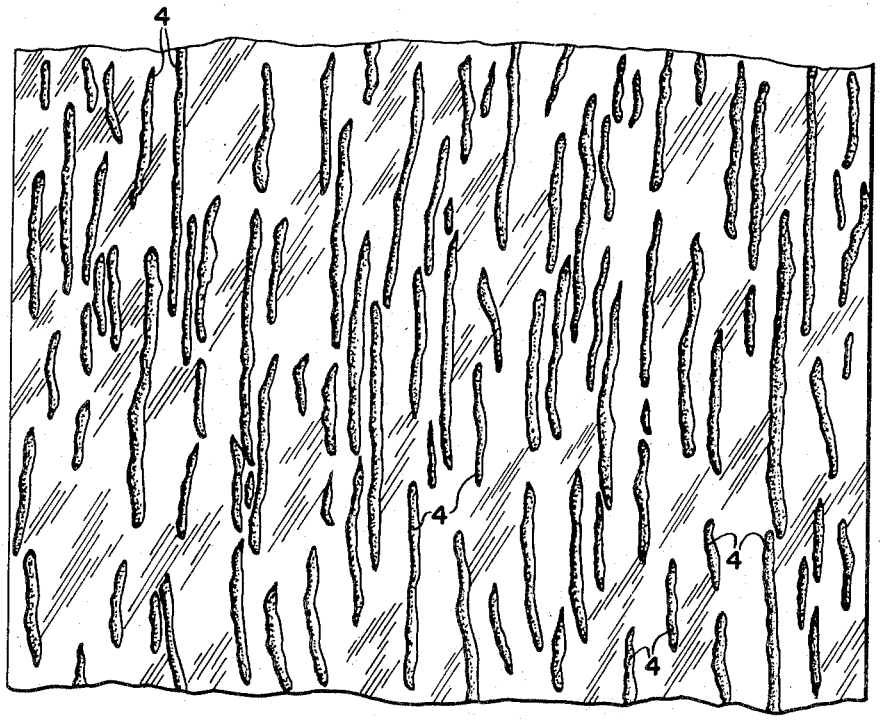
Fig. 5 is a plan view of the finished product.

The finished product comprises a fabric backing layer which has been given the numeral 1. For many reasons, this should be a woven, non-woven or knitted fabric constructed so that air may pass therethrough. This is important not only because, for many uses, the product should be porous throughout, but also because of the fact that in the preferred procedure the sponge layer is vulcanized by blowing hot air through the sponge. This effects a quicker cure and also removes the objectionable odors from the sponge. It is possible to substitute an impervious backing for the open fabric, but as noted some of the advantages of the preferred product will be sacrificed.

The layer 2 is the elastic or sponge layer, preferably made from foamed latex, either natural or artificial. Foamed latex is usually made by beating the latex until air is distributed very completely throughout the latex in a multitude of fine intercommunicating cells. The latex in the form of a foam is distributed over one side of the fabric layer 1 into which it penetrates to later form a vulcanized bond or anchorage in the fabric.

The latex is combined with a gelling agent and also with a vulcanizing agent, and such pigments, age resistants, and the like as are well known in the art.

In the outer surface of the cushion layer and extending part way to the base 1 are the depressions 4 which form the decorative patterns on the product. The formation of these depressions may be done by any preferred method, but the simplest and most efficient manner is to pass the layer of fabric and sponge over a patterned roller under sufficient pressure to form the pattern therein. In the manufacture of the material from foamed latex, it should be done either after the sponge has partially or completely gelled, but before vulcanization when the sponge attains a permanent form.

The coating or decorative layer over the outer surface of the embossed sponge layer is shown at 8. This coating is preferably one of the various synthetic resin varnishes or paints referred to above, although other paints or varnishes may be employed. The advantages of using varnishes made from synthetic resins are the fact that greater gloss or brilliance may be obtained, and the coating is flexible and will unite with the surface of the sponge so that it will not crack or flake off after hard use.

It will be observed that the porous character of the product has been retained because the communication between the fabric layer 1 and the outer surface is maintained through the depressions in the design.

Referring to the diagrammatic view shown in Fig. 1, in which a typical apparatus is depicted, the fabric 1 is led from the roll 10 through suitable tension devices over the front and lower face of a doctor knife 11, which is spaced a distance from a continuously moving belt 12 equal to the desired thickness of the sponge layer 2.

The belt 12 is a steel or leather belt, the surface of which is kept clean and polished so that the latex foam will set thereon with a smooth surface. On the surface of the belt, just in front of the doctor 11, is deposited a mass of the foamed latex or similar material which is discharged from a distributor 15 onto the belt, where it accumulates as an unformed mass. The forward movement of the belt and fabric draws a layer of the foam of even thickness through the throat formed by the belt and the doctor. As the foamed latex has a very considerable water content, it will penetrate into the pores or interstices of the fabric so that the sponge layer becomes vulcanized firmly to the fabric.

From this point, the composite layer of fabric and sponge passes into a heated chamber indicated by the numeral 16. The air in this chamber is kept in circulation by a fan 18 and the temperature is maintained at the point where the foamed latex will gel. In the form shown in Fig. 1, the foamed latex will have acquired sufficient set so that it can be embossed and will retain the embossing by a single pass through the oven 16.

As the sponge and fabric material passes out of the oven and under a roller 20, it is led to a second roller 22. Between the rollers 20 and 22 is an embossing roller 24 which is provided with the raised pattern to form the depressions 4 in the sponge layer. This roller 24 may be adjustably mounted so as to increase or decrease the pressure which it exerts on the sponge rubber. Such an adjustment is indicated at 27. The composite and embossed sponge is now led back into the oven 16 where it is subjected to additional heat for a sufficient period to complete the gelling of the sponge layer. In its final passage through the gelling over, the composite material is supported on driven belts 25.

The composite material is now led to the unit which applies the outer layer 8 over the tops of the embossed areas. In the drawing, a typical device for the purpose is shown as a bank of transfer rolls 26 which receive the coating from a tank 28 and transfer it to the embossed side of the composite sheet backed by a roller 30.

From the coating unit the composite material is led to the final curing or vulcanizing oven 32. For guiding and supporting the composite sheet during its passage through the oven, a tentering chain may be used such as shown and described in applicant's prior patent No. 2,628,654, dated February 17, 1953. In lieu of the tentering chain, the composite material may be supported by any known apparatus during its travel through the vulcanizing chamber for a sufficient interval of travel so that the layer of sponge rubber is completely vulcanized and the plastic coating completely set by the time it reaches the lower end of the chamber. During its passage through the chamber, the composite fabric is subject to heated air which is forced into the chamber through the duct 38 and out through duct 40.

The heat of vulcanization also dries and sets the coating 8 so that as the finished product issues from the chamber 32 it may be rolled up immediately.

Figure 6:
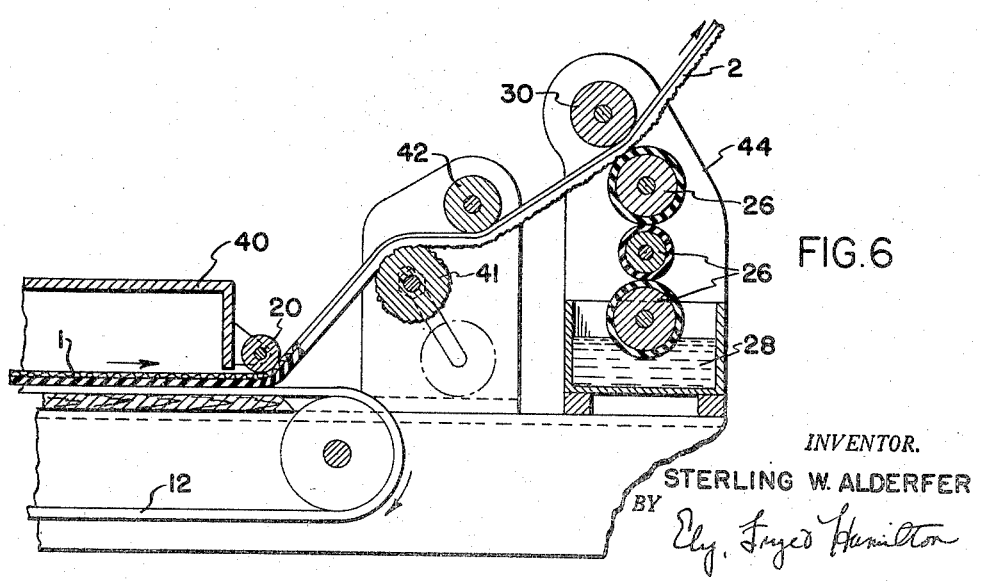
Fig. 6 is a view showing a modification in the operative procedure.

In the form shown in Fig. 6, the composite material is subjected to sufficient heat for a sufficient interval in the chamber 40 so that it may be passed over an adjustable embossing roll 41 and under a guide roll 42, and thence directly to the coating unit 44, where it receives the layer 8. The material then passes directly to a vulcanizing oven.

It will be seen that a new and decorative form of composite cushion and fabric has been created, and that the processes outlined above are adaptable for the manufacture of the product. Where the words "sponge rubber" are used in the claims, it will be understood that they comprehend other rubber-like materials which are capable of being formed into a sponge-like structure by beating in the air, by the use of blowing agents or gases, such for example as carbon-dioxide or nitrogen forced into the material under pressure.

The sponge layer may be described as having an open cellular structure by which it is meant that the cells are in communication with each other and with the atmosphere on either side of the sheet. The foamed layer may be pigmented to any desired color, if desired, contrasting with the color of the coating 8.

It will be seen that the foamed latex or other rubbery-like foam should be either wholly or partially gelled before the embossing operation, the requirement being that the foam shall not be vulcanized and that it be gelled at least to the extent that it will take and retain the embossed design. It will also be noted that to manufacture the finished product the coating 8 may be applied after the vulcanization of the sponge is completed.

What is claimed is:

1. A composite structure comprising an elastic sponge layer bonded on one side to a fabric, the opposite surface of the sponge layer having designs formed therein in intaglio, and an impervious, flexible, protective coating on areas of the said opposite surface of the sponge layer between the depressions, the depressed areas being free of the protective coating, the sponge body having an open cellular structure in communication with the interstices of the fabric and with the depressed portions of the sponge layer.

2. A composite structure comprising a fabric and an elastic sponge layer bonded to one side of the fabric, the opposite surface of the sponge layer being in a plane except where formed with a design in intaglio, and a flexible, protective coating applied only over the plane areas of the said opposite surface of the sponge layer.

3. A composite structure comprising a fabric and an elastomeric sponge layer bonded to one side of the fabric, the opposite surface of the sponge layer being in a plane except where formed with a design in intaglio, and a coating of a flexible synthetic resin applied only over the plane areas of the said opposite surface of the sponge layer.

4. A composite structure comprising a fabric and an elastomeric sponge layer having an open cellular structure bonded to one side of the fabric, the opposite surface of the sponge layer being in a plane except where formed with a design in intaglio, and a coating of a flexible synthetic resin applied only over the outer plane areas of the said opposite surface of the sponge layer.

5. A composite structure comprising backing layer, an elastomeric sponge layer bonded to one side of the backing layer, the opposite surface of the sponge layer being in a plane and formed with a design in intaglio, and a flexible, protective coating applied only over the plane areas of the said opposite surface of the sponge layer, the depressed areas being free of said coating.

6. The process of manufacturing a decorative cushion material comprising applying a layer of foamed vulcanizable latex to one surface of a fabric, gelling the foamed material, embossing the opposite surface of the foamed layer to form a design in intaglio therein, coating the plane areas of the said opposite surface of the layer without coating the depressions therein, and vulcanizing the layer.

7. The process of manufacturing a decorative cushion material comprising applying a layer of foamed vulcanizable latex to one surface of a backing layer, gelling the foamed material, embossing the opposite surface of the foamed layer to form a design in intaglio therein, vulcanizing the foamed layer to form a sponge-like structure, coating the plane areas of the said opposite surface of the foamed layer with a protective coating without coating the depressed portions of the foamed layer.

8. The process of manufacturing a decorative cushion material comprising applying a layer of foamed material capable of setting to an elastic sponge to one surface of a fabric, gelling the foamed material to the extent that it will retain an embossed design therein, forming a design in intaglio in the layer on the exposed side, coating only the high portions of the exposed side of the layer with a flexible, protective coating and subjecting the composite material thus formed to heat sufficient to set the said layer.

9. The process of manufacturing a decorative cushion material comprising applying a layer of foamed vulcanizable latex to one surface of a fabric, gelling the foamed material to the extent that it will retain an embossed design therein, forming a design in intaglio in the layer on the exposed side, coating only the high portions of the exposed side of the layer with a flexible, protective coating and subjecting the composite material thus formed to heat sufficient to vulcanize the gelled latex of said layer.

10. The process of manufacturing a decorative cushion material comprising applying a layer of foamed vulcanizable latex to one surface of a fabric, gelling the foamed material to the extent that it will retain an embossed design therein, forming a design in intaglio in the layer by compressing portions of the gelled foam without disturbing the balance of the gelled foam, subjecting the composite material thus formed to heat sufficient to set the said layer and vulcanize the gelled material, and applying a protective coating only to the uncompressed surfaces of the gelled foam.

11. The process of manufacturing a decorative cushion material comprising applying a layer of foamed vulcanizable latex to one surface of a fabric, gelling the foamed material to the extent that it will retain an embossed design therein, forming a design in intaglio in the layer by compressing portions of the gelled foam without disturbing the balance of the gelled foam, subjecting the composite material thus formed to heat sufficient to vulcanize the gelled latex of said layer and applying a protective coating only to the uncompressed surfaces of the gelled foam.

12. The process of manufacturing a decorative cushion material comprising applying a layer of foamed material capable of being set to an elastic sponge to one surface of a fabric, gelling the foam material to the extent that it will retain an embossed design therein, forming a design in intaglio in the layer on the exposed side, subjecting the layer to heat sufficient to set said layer into an elastic sponge and coating only the high portions of the exposed side of the layer with a flexible protective coating.

References Cited in the file of this patent

UNITED STATES PATENTS

| | | |
|---|---|---|
| 1,818,576 | Parrett | Aug. 11, 1931 |
| 2,325,903 | Blair et al. | Aug. 3, 1943 |
| 2,434,527 | Untiedt | Jan. 13, 1948 |
| 2,482,154 | Charlton et al. | Sept. 20, 1949 |